(12) United States Patent
Li et al.

(10) Patent No.: US 9,998,217 B2
(45) Date of Patent: Jun. 12, 2018

(54) FREE-SPACE OPTICAL COMMUNICATIONS FOR MOBILE DEVICES

(71) Applicant: Nokia Technologies Oy, Espoo (FI)

(72) Inventors: Hongwei Li, Cambridge (GB); David Bitauld, Cambridge (GB); Antti Niskanen, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 15/110,175

(22) PCT Filed: Jan. 30, 2014

(86) PCT No.: PCT/US2014/013907
§ 371 (c)(1),
(2) Date: Jul. 7, 2016

(87) PCT Pub. No.: WO2015/116112
PCT Pub. Date: Aug. 6, 2015

(65) Prior Publication Data
US 2016/0329961 A1    Nov. 10, 2016

(51) Int. Cl.
*H04B 10/00* (2013.01)
*H04K 1/02* (2006.01)
(Continued)

(52) U.S. Cl.
CPC ......... *H04B 10/112* (2013.01); *H04B 1/3833* (2013.01); *H04B 10/118* (2013.01);
(Continued)

(58) Field of Classification Search
CPC .............. H04B 10/112; H04B 10/1125; H04B 10/1129; H04B 10/118; H04B 10/40; H04B 10/503; H04B 1/3833
(Continued)

(56) References Cited

U.S. PATENT DOCUMENTS 5,790,291 A    8/1998 Britz
6,556,324 B1    4/2003 Meier
(Continued)

OTHER PUBLICATIONS

International Search Report and Written Opinion received for corresponding Patent Cooperation Treaty Application No. PCT/US2014/013907, dated Dec. 14, 2014, 11 pages.
(Continued)

*Primary Examiner* — Amritbir Sandhu
(74) *Attorney, Agent, or Firm* — Mintz Levin Cohn Ferris Glovsky and Popeo, P.C.

(57) ABSTRACT

Methods and apparatuses, including computer program code are disclosed. The apparatus may include at least one processor and at least one memory including computer program code. The at least one processor, the at least one memory, and the computer program code may be configured to cause the apparatus to generate a divergent beam for an optical source that is coincident with a divergent beam for an optical detector. The apparatus may determine an adjustment to a mirror to cause an optical alignment of an incoming beam with the optical detector based on at least an optical intensity across the optical detector, wherein the alignment is with respect to at least another apparatus. The apparatus may adjust a position of the mirror according to the determined adjustment, and change the divergent beam to a collimated beam to enable optical communications with the other apparatus via the collimated beam.

16 Claims, 8 Drawing Sheets

(51) Int. Cl.
*H04L 9/08* (2006.01)
*H04B 10/112* (2013.01)
*H04B 10/118* (2013.01)
*H04B 1/3827* (2015.01)
*H04B 10/40* (2013.01)
*H04B 10/50* (2013.01)

(52) U.S. Cl.
CPC ..... *H04B 10/1125* (2013.01); *H04B 10/1129* (2013.01); *H04B 10/40* (2013.01); *H04B 10/503* (2013.01)

(58) Field of Classification Search
USPC .............. 398/131, 118, 127, 128, 129, 130; 380/255–278
See application file for complete search history.

(56) References Cited

U.S. PATENT DOCUMENTS

| | | | |
|---|---|---|---|
| 6,658,214 B1 | 12/2003 | Ito | |
| 6,915,080 B2* | 7/2005 | Heminger | B81B 3/0062 398/121 |
| 6,970,651 B1 | 11/2005 | Schuster et al. | |
| 7,529,373 B2 | 5/2009 | Young et al. | |
| 7,721,955 B2* | 5/2010 | Harrison | G06Q 20/367 235/380 |
| 8,160,452 B1* | 4/2012 | Tidwell | H04B 10/118 398/138 |
| 8,184,989 B2* | 5/2012 | Maeda | H04L 9/0852 380/256 |
| 8,275,911 B1 | 9/2012 | Gough | |
| 8,774,638 B2* | 7/2014 | Duligall | H04B 10/1141 380/255 |
| 9,002,009 B2* | 4/2015 | Nordholt | H04L 9/083 380/256 |
| 9,148,225 B2* | 9/2015 | Lowans | H04B 10/70 |
| 9,236,942 B1* | 1/2016 | Roberds | G02B 6/3816 |
| 2002/0131121 A1* | 9/2002 | Jeganathan | H04B 10/1127 398/128 |
| 2002/0196506 A1 | 12/2002 | Graves et al. | |
| 2003/0228152 A1 | 12/2003 | Takahashi et al. | |
| 2004/0208597 A1 | 10/2004 | Wittenberger et al. | |
| 2007/0016534 A1* | 1/2007 | Harrison | G06Q 20/367 705/65 |
| 2007/0025551 A1* | 2/2007 | Harrison | G06Q 20/367 380/256 |
| 2007/0031151 A1* | 2/2007 | Cunningham | H04B 10/1123 398/131 |
| 2009/0252499 A1* | 10/2009 | Rotgaizer | H04B 10/1123 398/131 |
| 2009/0310784 A1* | 12/2009 | Duligall | H04B 10/1141 380/256 |
| 2011/0286749 A1* | 11/2011 | Schoon | H04B 10/1125 398/128 |
| 2012/0039617 A1 | 2/2012 | Duligall et al. | |
| 2012/0121271 A1* | 5/2012 | Wood | H04B 10/1121 398/118 |
| 2012/0308239 A1* | 12/2012 | Sheth | H04B 10/1125 398/131 |
| 2012/0328290 A1 | 12/2012 | Yuan et al. | |
| 2013/0308956 A1 | 11/2013 | Meyers et al. | |
| 2014/0241731 A1* | 8/2014 | Peach | H04B 10/1127 398/128 |
| 2014/0248049 A1* | 9/2014 | Saint Georges | H04B 10/1125 398/25 |
| 2015/0171962 A1* | 6/2015 | Archer | H04B 10/11 398/118 |
| 2015/0249537 A1* | 9/2015 | Wabnig | H04B 10/70 380/256 |
| 2016/0072580 A1* | 3/2016 | Wabnig | H04B 10/70 398/131 |
| 2016/0087722 A1* | 3/2016 | Wabnig | H04B 10/1143 398/131 |
| 2016/0088511 A1* | 3/2016 | Nguyen | H04L 5/006 398/115 |
| 2016/0294472 A1* | 10/2016 | Palmer | H04B 10/116 |
| 2017/0045752 A1* | 2/2017 | Bitauld | G02B 27/283 |

OTHER PUBLICATIONS

D'Ambrosio, et al., "Complete experimental toolbox for alignment-free quantum communication," *Nature Communications 3*, Article 961, Jul. 17, 2012.

* cited by examiner

FREE-SPACE OPTICAL COMMUNICATIONS FOR MOBILE DEVICES

RELATED APPLICATION

This application was originally filed as Patent Cooperation Treaty Application No. PCT/US2014/013907 filed Jan. 30, 2014.

The subject matter described herein relates to free-space optical communications for mobile devices.

BACKGROUND

Many modern electronic devices connect to other electronic devices in order to share data. Some data connections are wired via a cable with connectors on each end that couple with connectors in the electronic devices to share data between the devices. Some data connections are wireless allowing a data connection between devices that does not require a cable. Electronic devices that require data to be shared include a wide variety of consumer and industrial products including mobile devices such as cell phones, handheld computing devices, laptops, and the like. As the features and capabilities available in mobile devices has increased, the need for higher throughput data connections has also increased. For example, high-definition video captured on a mobile device and sent via a data connection to another device requires a high-throughput data connection.

SUMMARY

In one aspect, there is an apparatus. The apparatus may include at least one processor and at least one memory including computer program code. The at least one processor, the at least one memory, and the computer program code may be configured to cause the apparatus to generate a divergent beam for an optical source that is coincident with a divergent beam for an optical detector. The apparatus may determine an adjustment to a mirror to cause an optical alignment of an incoming beam with the optical detector based on at least an optical intensity across the optical detector, wherein the alignment is with respect to at least another apparatus. The apparatus may adjust a position of the mirror according to the determined adjustment, and may change the divergent beam to a collimated beam to enable optical communications with the other apparatus via the collimated beam.

In some variations, one or more of the features disclosed herein including the following features can optionally be included in any feasible combination. The apparatus may be a user equipment of a radio network. The radio network may include a cellular network or any other type of wireless network. The apparatus may be registered with a network node of the radio network, wherein the network node enables the apparatus to communicate with the other apparatus using the optical communications. The optical communications may include laser communications. The information carried by the laser communications may be encoded and/or decoded using a quantum key distribution to ensure secure communications. The determining, the adjusting, and the changing may be performed automatically; that is without user input or intervention. The apparatus may further include communicating information between the apparatus and the other apparatus using the divergent beam.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
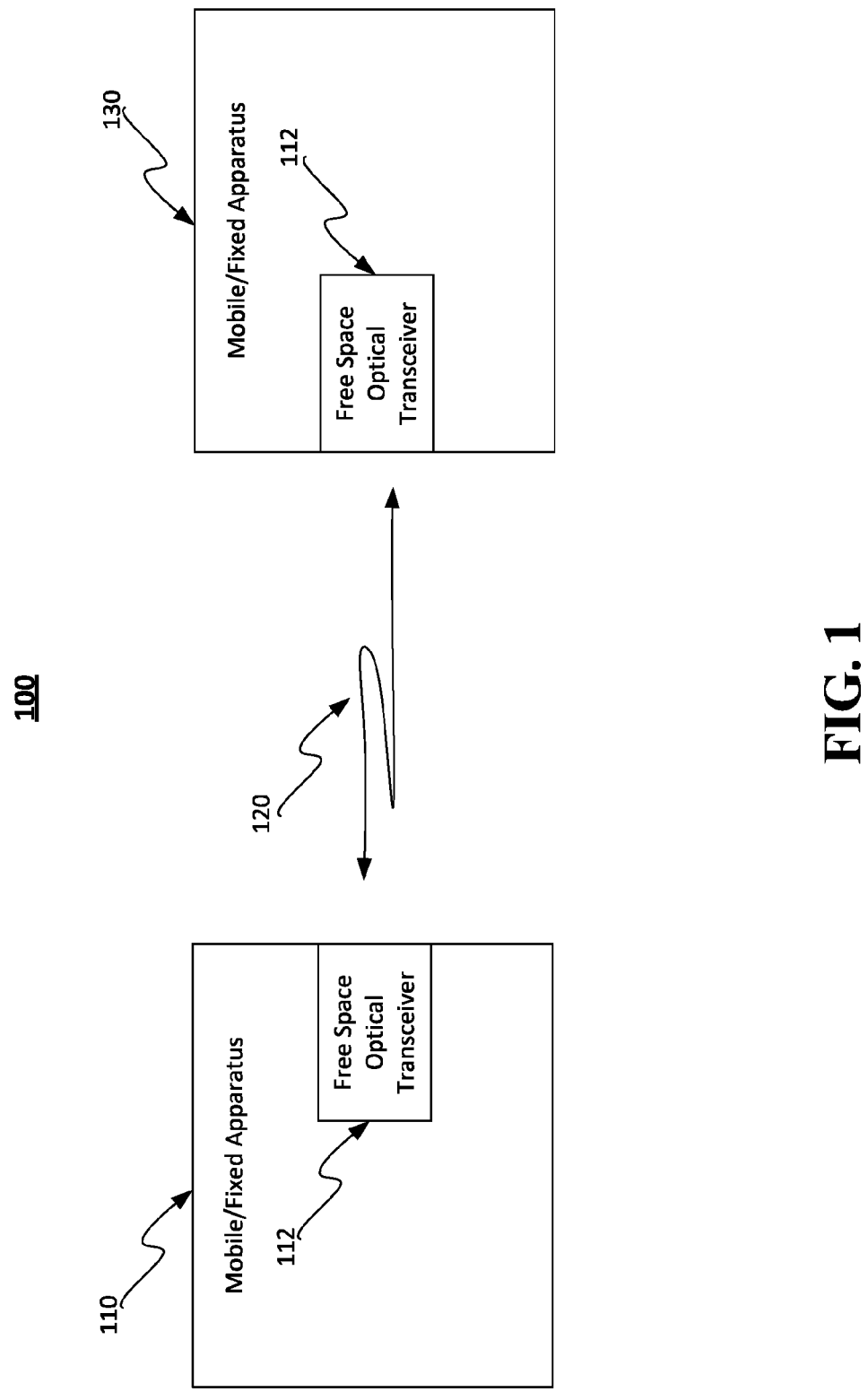
FIG. 1 depicts an example of a system including free-space optical communications between two apparatuses, in accordance with some example embodiments.

Like labels are used to refer to same or similar items in the drawings.

DETAILED DESCRIPTION

Some electronic devices may be considered mobile devices. These electronic devices include, for example, cell phones, portable computers, gaming devices, and the like. The capability of some modern electronic devices has increased dramatically including the data generating capability and processing capability of received data. The increased data generating and processing capabilities of mobile devices has created an increased demand for high-throughput data communications. Wired and/or wireless communications may be used to provide data communications between a mobile device and another mobile device or a fixed device. In some situations, wired communications are inconvenient because they require working cable with the correct connectors, and so on. In some situations, wireless radio frequency (RF) and wireless optical communications are more convenient. Some wireless RF communications may operate at radio frequencies between 100 KHz and 10 GHz. In some embodiments consistent with the subject matter disclosed herein, wireless communication may include optical communications and, in particular, free-space optical communications. Free-space optical communications may be performed from an optical transmitter to an optical receiver through an open medium such as through air from a mobile device to another device.

In some example embodiments, the free-space optical transmitter may self-align an optical transmit beam with a free-space optical receiver. In some example embodiments, a free-space optical receiver may self-align an optical detector with the free-space optical transmitter. In some example embodiments, the self-alignment of the optical transmitter and optical receiver may track motion of the transmitter and/or receiver and adjust the alignment to maintain communications. In some example embodiments, the self-alignment tracks motion at frequencies including about 15 Hz. Motion of the transmitter and/or receiver may be due to the motion of a human hand holding the mobile device. In some example embodiments, the optical transceiver may be integrated into a small package suitable to being incorporated into a small mobile telephone.

FIG. 1 depicts an example of a system 100 including free-space optical communications between two apparatuses, in accordance with some example embodiments. A mobile or fixed apparatus 110 may include a free-space optical transceiver 112, and a second mobile or fixed apparatus 130 may also include a free-space optical transceiver 112. Mobile/fixed apparatus 110 and mobile/fixed apparatus 130 may communicate with free-space optical transceivers 112 through a medium 120 such as air.

Mobile/fixed apparatus 110 may be any type of electronic apparatus such as a mobile telephone, a mobile computing device, a computer, and the like. For example, apparatus 110 may be a mobile telephone with free-space optical transceiver 112 integrated into the mobile telephone. Free-space optical transceiver 112 may be configured to send and/or receive any type of data including digital data and analog data. For example, free-space optical transceiver 112 may send and/or receive any type of digital data including internet protocol data, digitized video data, digitized audio data, configuration data for mobile apparatus 110, and so on. Free-space optical transceiver may send and/or receive analog signals such as video signals including National Television System Committee (NTSC) video, analog audio, and any other type of analog information.

Mobile/fixed apparatus 130 may be any type of electronic apparatus such as a another mobile telephone, a mobile computing device, a computer, and the like. For example, apparatus 130 may be another mobile telephone with free-space optical transceiver 112 integrated into the mobile telephone. Free-space optical transceiver 112 may be configured to send and/or receive any type of data including digital data and analog data.

Mobile/fixed apparatus 110 may communicate with mobile/fixed apparatus 130 through medium 120. In most embodiments, medium 120 is the air found in the space separating mobile/fixed device 110 from mobile/fixed device 130. In some implementations, the medium may be composed of one or more other materials such as water, or may be empty space (such as outside Earth's atmosphere), or may be composed of a combination of materials.

Figure 2:
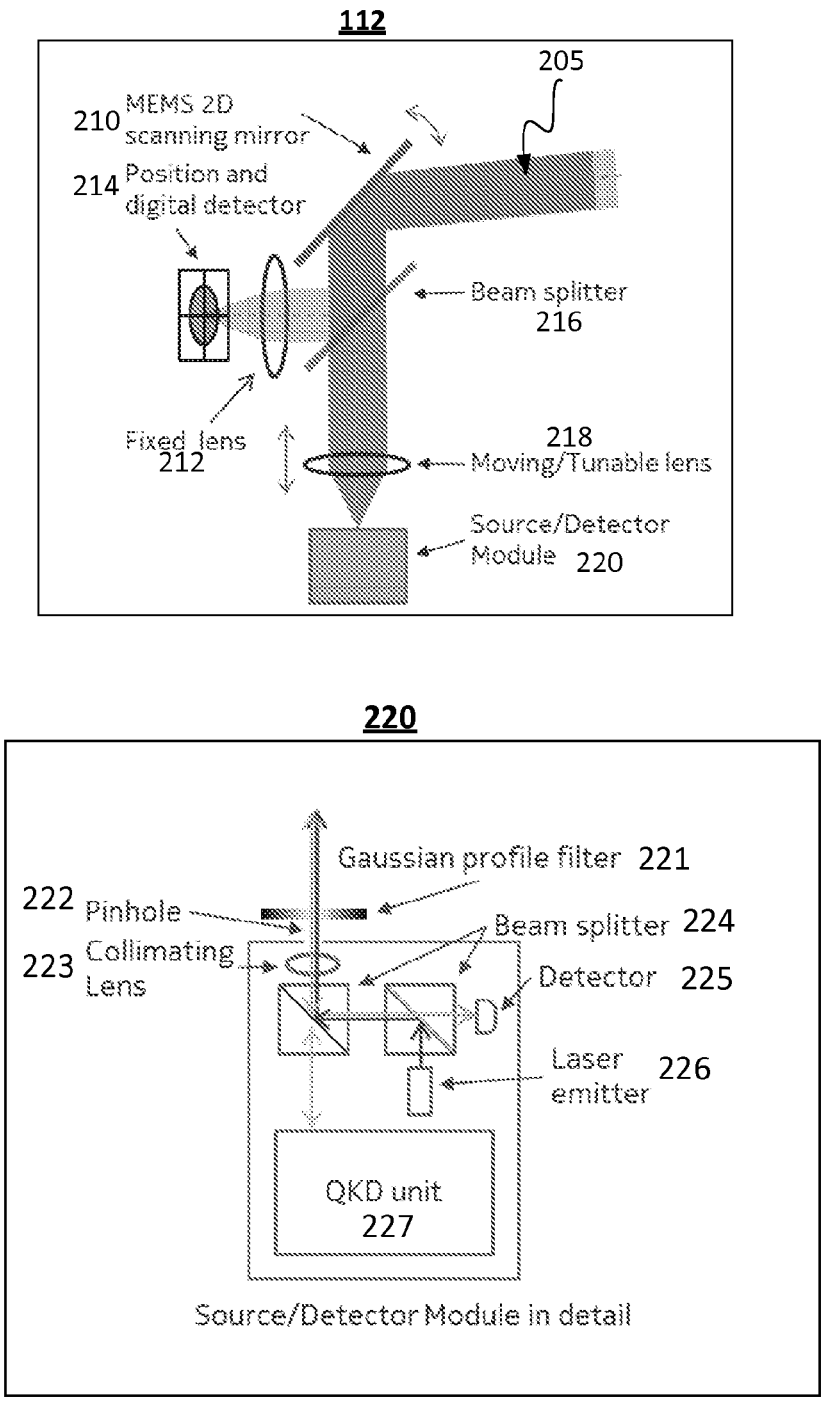
FIG. 2 depicts an example of a free-space optical transceiver and a source/detector module, in accordance with some example embodiments.

FIG. 2 depicts an example of a free-space optical transceiver 112 and source/detector module 220, in accordance with some example embodiments. Optical transceiver 112 may include a scanning mirror 210, fixed lens 212, detector 214, beam splitter 216, tunable lens 218, and source/detector module 220. The source/detector module 220 may include a Gaussian profile filter 221, pinhole 222, collimating lens 223, beam splitters 224, detector 225, and laser 226, and quantum key distribution unit 227.

Scanning mirror 210 may adjust the position to which incoming/outgoing beams 205 are pointed. For example, scanning mirror may be a two-axis scanning mirror such as a microelectromechanical system (MEMS) scanning mirror. A two-axis scanning mirror may adjust angles of the mirror in two dimensions causing pointing control of incoming/outgoing beam 205 in two dimensions. The beams 205 can thus be pointed in any direction within the range of angles the scanning mirror is capable of pointing.

Beam splitter 216 may reflect a portion of incoming beam 205 to detector 212 through fixed lens 212. Incoming beam 205 may be focused so that the position the incoming beam 205 on position detector 214 indicates whether the transmitter (e.g. located across the room) is aligned with detector 214 through scanning mirror 212 and beam splitter 216. In some example embodiments, the position of the incoming beam on detector 214 may determine in what direction scanning mirror 210 should be adjusted to improve the alignment and by how much it should be adjusted. A portion of incoming beam 205 passes through beam splitter 216, tunable lens 218, to source/detector module 220 where the incoming beam may be detected and received.

In some example embodiments, digital communications between an apparatus such as mobile/fixed apparatus 110 and mobile/fixed apparatus 130 may include quantum key distribution (also referred to herein as quantum communications) and/or a modulated laser communications channel (also referred to as laser communications). For example, quantum communications may be implemented in optical transceiver 112 in source/detector module 220 at quantum key distribution unit 227 and laser 226. Laser-based communications may be implemented using a laser 226 and detector 214 and/or detector 225 at the receiver. Moreover, data may be encoded with the keys generated by quantum communications to ensure secure communications. Quantum communications and laser communications may be separated in time where one is used in certain time slots and the other is used in other time slots.

In some example embodiments, computer program code stored in at least one non-transitory memory, implemented on at least one processor may determine adjustments to the position of scanning mirror 210 in order to improve the alignment with the transmitter based on the intensity of incoming beam 205 across detector 214.

Figure 3:
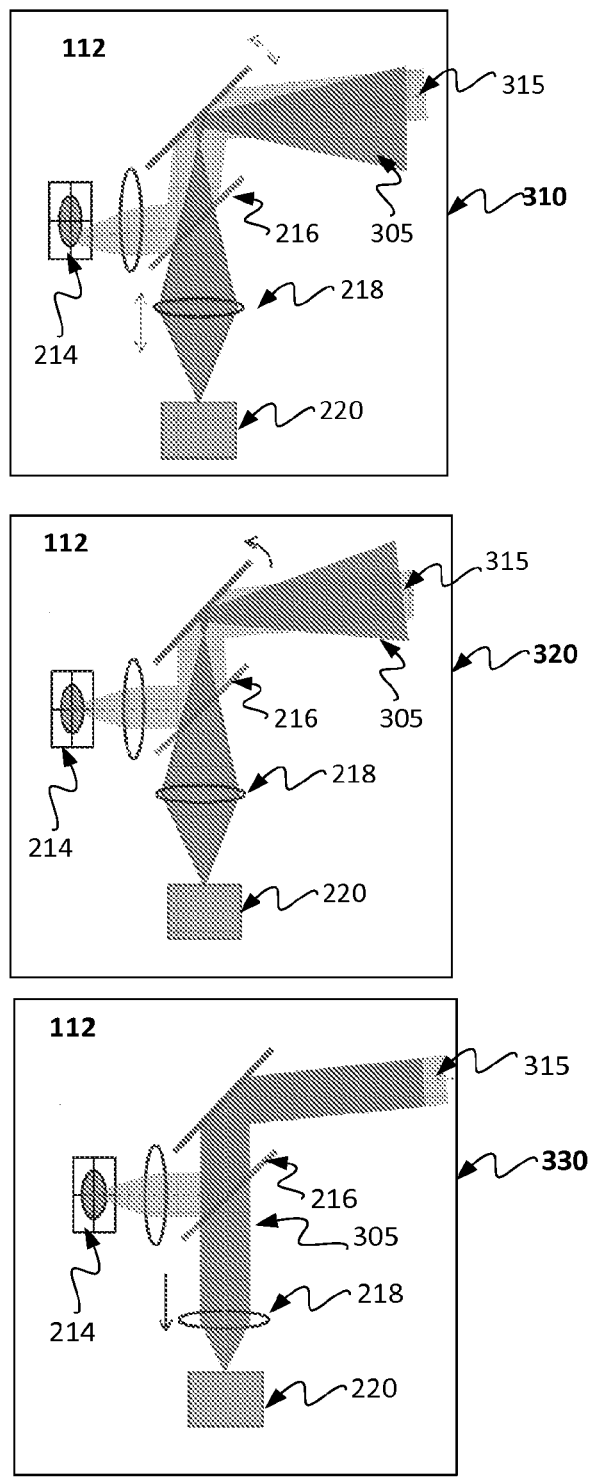
FIG. 3 depicts a progression of alignment of an optical transceiver from unaligned to aligned, in accordance with some example embodiment.

FIG. 3 depicts a process of self-alignment of an optical transceiver from unaligned to aligned, in accordance with some example embodiments. In some example embodiments, prior to the beginning of the self-alignment process, the optical transceivers of apparatuses 110 and 130 may be roughly aligned so that the transceivers of both apparatuses are within the solid angle of the divergent beams from the other apparatus. FIG. 3 includes features of FIGS. 1 and 2. At 310, an optical transceiver such as optical transceiver 112 in apparatus 110 may be configured to determine whether it is self-aligned with another optical transceiver 112 in another apparatus, such as apparatus 130. At 320, when the optical transceiver 112 of apparatus 110 is not self-aligned with the optical transceiver at apparatus 130, scanning mirror 210 may be adjusted to improve the alignment between the transmitter of apparatus 110 and receiver of apparatus 130, and the transmitter of apparatus 130 with the receiver of apparatus 110. At 330, when self-alignment between the optical transceiver of apparatus 110 and apparatus 130 is complete, tunable lens 218 may be adjusted to collimate the incoming/outgoing beams 205 to/from source/detector module 220.

At 310, optical transceiver 112 of apparatus 110 may determine whether 110 is self-aligned with another optical transceiver such as optical transceiver 112 of apparatus 130, in accordance with some example embodiments. Prior to self-alignment, rough alignment is performed with tunable lens 218 configured to cause the outgoing beam 305 to be divergent. The divergent outgoing beam 305 of optical transceiver 112 of apparatus 110 may illuminate a larger area around apparatus 130 compared to when tunable lens 218 is configured to collimate outgoing beam 305. The divergence angle and thus the area illuminated by laser 226 (part of 220) of apparatus 110 at any given distance, such as the distance apparatus 130 is away from apparatus 110, may be controlled by tunable lens 218. Divergent outgoing beam 305 may facilitate a self-alignment of apparatus 110 with apparatus 130 and apparatus 130 with apparatus 110.

Beam splitter 216 may reflect a portion of incoming beam 315 to detector 214 through fixed lens 212, in accordance with some example embodiments. Detector 214 may include an optical quadrant detector, charge-coupled device (CCD) camera, or other optical position sensitive detector. Incoming beam 315 may be focused so that the position of the incoming beam 315 on detector 214 indicates whether the optical transceiver 112 at apparatus 110 is aligned with optical transceiver 112 at apparatus 130. In some example embodiments, the position of the incoming beam 315 on detector 214 determines in what direction and how much scanning mirror 210 should be adjusted to improve alignment. A portion of incoming beam 315 passes through beam splitter 216, tunable lens 218, and impinges on source/detector module 220 where the incoming beam 315 may be detected.

In order to achieve self-alignment, scanning mirror 210 may adjust the position to point outgoing beam 305 to which incoming beam 315 comes from. For example, scanning mirror 210 may be a two-axis scanning mirror that may adjust angles of the mirror in two dimensions. The outgoing beams 305 can thus be pointed in any direction within the range of angles the scanning mirror is capable of pointing.

At 320, when the optical transceiver 112 of apparatus 110 is not self-aligned with the optical transceiver at apparatus 130, scanning mirror 210 may be adjusted to improve the alignment between the transmitter of apparatus 110 and receiver of apparatus 130, and the transmitter of apparatus 130 with the receiver of apparatus 110, in accordance with some example embodiments. The amount of adjustment to scanning mirror 210 and the direction of adjustment in each of the two-axis may be determined by the intensity of light across detector 214. After one or more adjustments, optical transceiver 112 of apparatus 110 may be aligned with apparatus 130.

At 330, when self-alignment of the optical transceiver 112 of apparatus 110 and self-alignment of the optical transceiver 112 of apparatus 130 are both complete or within an acceptable tolerance of alignment error, tunable lens 218 is adjusted to collimate the outgoing beam 305 and incoming beam 315 from/to source/detector module 220. Once self-aligned and collimated, quantum communication data may be sent from source module 220 of apparatus 110 to detector module 220 of apparatus 130. Quantum communication data may also be sent from source module 220 of apparatus 130 to detector module 220 of apparatus 110. Laser communications may be duplexed in time with the quantum communications. For example, laser 226 of apparatus 110 may be modulated to encode information using any type of modulation that may be received by detector 214 and/or detector 225 of apparatus 130. Laser 226 of apparatus 130 may also be modulated to encode information using any type of modulation that may be received by detector 214 and/or detector 225 of apparatus 110. In some example embodiments, communications via the collimated beam provides secure communications due to the small viewing angle of the collimated beam. In some example embodiments, the collimated beam may illuminate apparatus 110 or a portion of apparatus 110 and no more, thereby preventing interception of the data sent to apparatus 110 by an observer.

Figure 4:
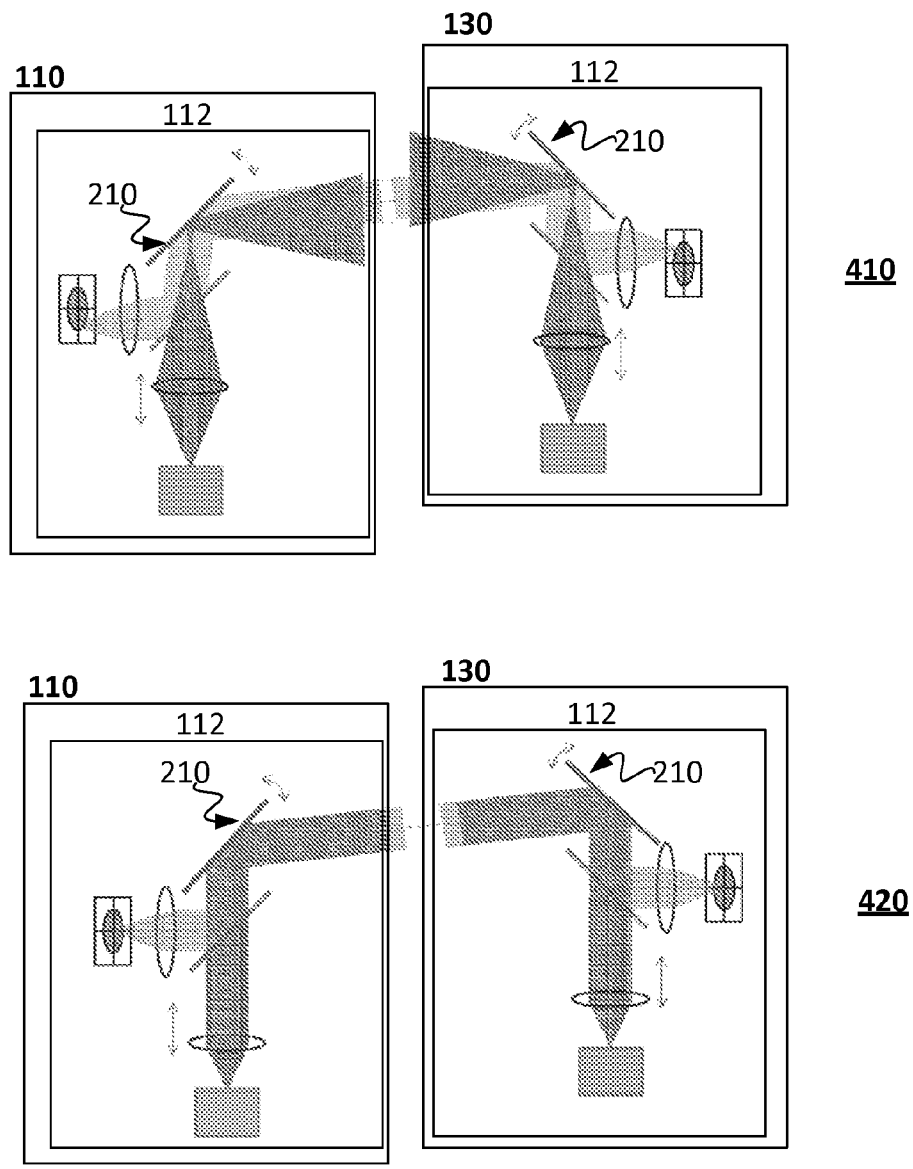
FIG. 4 depicts configurations of an optical transceiver during, and after, alignment with another optical transceiver, in accordance with some example embodiments.

FIG. 4 depicts configurations of an optical transceiver during self-alignment with another optical transceiver, and after self-alignment, in accordance with some example embodiments. At 410, two apparatuses each with optical transceivers are within range of one another and the self-alignment process has started. At 420, the optical transceivers of the apparatuses are self-aligned and outgoing beams 305 of both optical transceivers and incoming beams 315 of both transceivers may be collimated. FIG. 4 includes some features of FIGS. 1, 2, and 3.

At 410, the optical transceiver 112 of apparatus 110 is self-aligning with the optical transceiver of apparatus 130 by adjusting the scanning mirror 210 of apparatus 110, in accordance with some example embodiments. The optical transceiver of apparatus 130 is also self-aligning with the optical transceiver of apparatus 110 by adjusting the scanning mirror 210 of apparatus 130. Adjustments to the scanning mirrors of apparatuses 110 and 130 may occur in real-time. For example, when one or both of apparatuses is a mobile apparatus, the adjustments to mirrors 210 may occur in response to the movement in order to maintain alignment between the optical transceivers. The distance between apparatus 110 and apparatus 130 may be 5-20 meters although other distances may be used as well.

At 420, self-alignment of the apparatus 110 optical transceiver 112 with the apparatus 130 optical transceiver 112 is complete or the self-alignment is within an acceptable tolerance that supports communications, in accordance with some example embodiments. The tunable mirrors of apparatuses 110 and 130 have been adjusted to provide collimated beams 305 and 315 at both apparatuses. Adjustments to the scanning mirrors of apparatuses 110 and 130 may occur in real-time. For example, when one or both of apparatuses are mobile apparatuses, the adjustments to mirrors 210 may occur in response to the movement in order to maintain alignment between the optical transceivers.

Figure 5:
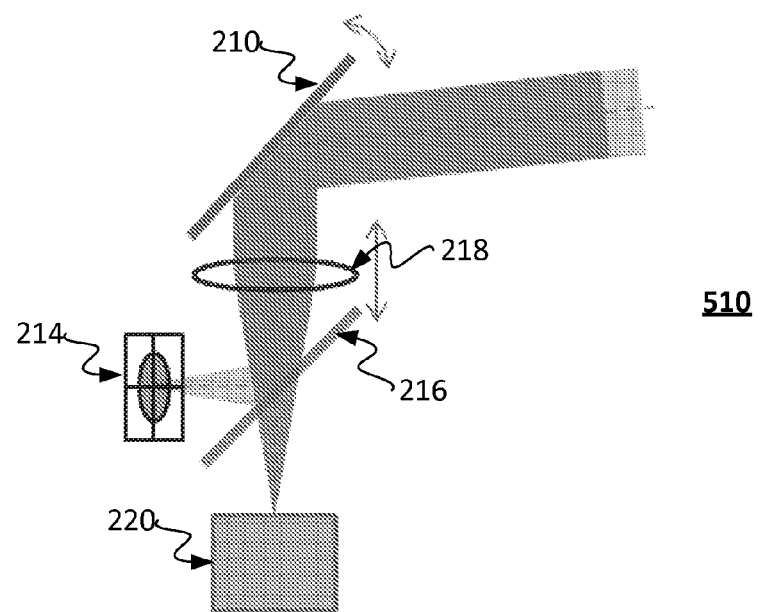
FIG. 5 depicts additional examples of a free-space optical transceivers, in accordance with some example embodiments.
Figure 5:
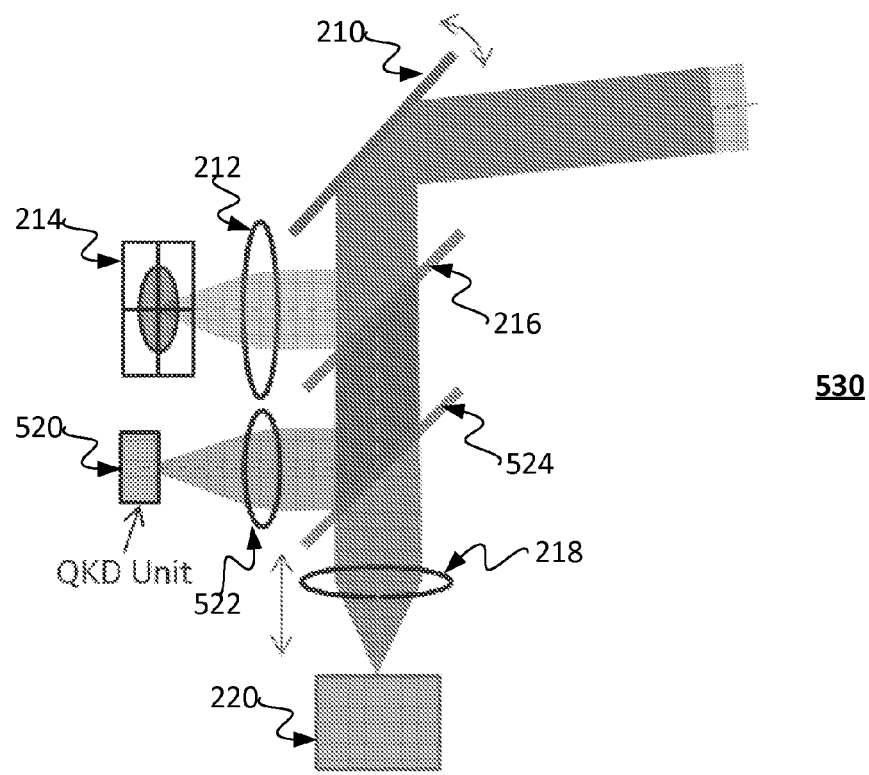

FIG. 5 depicts other examples of free-space optical transceivers, in accordance with some example embodiments.

At 510, compared to the optical transceiver of FIGS. 2-4, the optical transceiver has the position of tunable lens 218 moved to between the scanning mirror 210 and beam splitter 216. In some embodiments, fixed lens 212 may be removed. Other placements of tunable lens 218 and/or other optical components may also be used. Other and/or additional optical components may also be used.

At 530, compared to the optical transceiver of FIGS. 2-4, the optical transceiver has an additional beam splitter 524, fixed lens 522, and quantum key distribution unit 520. Other placements of additional quantum key distribution unit 520 and/or other optical components may also be used. Other and/or additional optical components may also be used.

Figure 6:
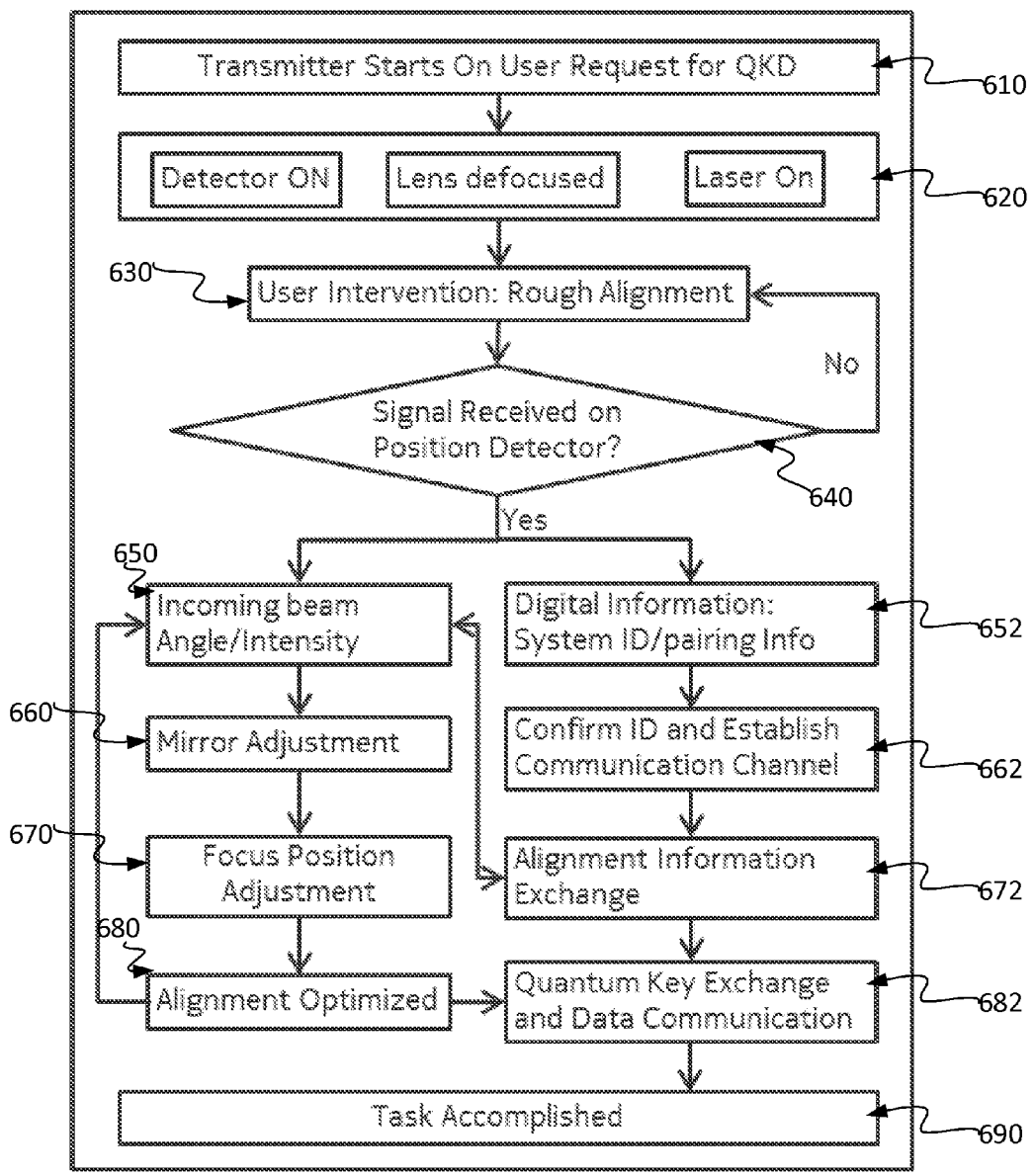
FIG. 6 depicts an example of a process performed by a free-space optical transmitter, in accordance with some example embodiments.

FIG. 6 depicts an example of a process 600 for a free-space optical transmitter, in accordance with some example embodiments. At 610, the user may request quantum communications and/or laser communications at an apparatus such as apparatus 110. At 620, the optical transmitter at an apparatus such as apparatus 110 may be initialized. At 630, the beam of apparatus 110 may be roughly aligned with the receiver at apparatus 130. A transmit beam from apparatus 130 may also be roughly aligned with apparatus 110. At 640, the optical transceiver at apparatus 110 may determine if a signal is received from the transmitter of apparatus 130. At 650, 660, 670, and 680, the optical transceiver at apparatus 110 may determine using its detector 214, the angle and intensity of the beam from apparatus 130, and may adjust the mirror to achieve self-alignment. At 652, 662, 672, and 682, quantum communications and/or laser communication may be started.

At 610, the user may request quantum communications, in accordance with some example embodiments. For example, the user of an apparatus 110 may initiate the sending of photon pulses including no more than one photon per pulse on average to another user at another apparatus 130, although other average numbers of photons per pulse may also be used as well. For example, apparatuses 110 and 130 may be cellular/mobile telephones. For example, the user at apparatus 110 may request quantum communications through an application running on the mobile apparatus 110 such as an application that manages communications such as cellular, Wi-Fi, laser, and/or Bluetooth communications. In some example embodiments, secret keys generated by quantum communication may be used for encoding/decoding the cellular, Wi-Fi, laser, and/or Bluetooth communications between apparatuses 110 and 130.

At 610, the user may request laser communications, in accordance with some example embodiments. For example, the user of an apparatus 110 may initiate the sending of streaming video to another user at another mobile apparatus 130 located across a room. For example, apparatuses 110 and 130 may be cellular/mobile telephones. For example, the user at apparatus 110 may request laser communications through an application running on the mobile apparatus 110 such as an application that manages cellular, Wi-Fi, Bluetooth, and quantum communications on the mobile apparatus 110. Moreover, the laser communications may be encoded with a secret key generated by quantum communications to ensure secure communications.

At 620, the optical transmitter at apparatus 110 may be initialized by turning on one or more of detectors 214 and 220, adjusting tunable lens 218 to provide divergent incoming/outgoing beams 205, and turning on the laser 226. For example, detectors 214 and 220, tunable lens 218, and laser 226 of optical transceiver 112 in apparatus 110 may be turned on or controlled by one or more electronically controlled switches in optical transceiver 112. In some example embodiments, detectors 214 and 220, laser 226, and tunable lens 218 may be controlled by executable instructions in a processor contained in the optical transceiver 112 or apparatus 110.

At 630, the beam of apparatus 110 is roughly aligned with the receiver at apparatus 130, in accordance with some example embodiments. Rough alignment may include the user of apparatus 110 pointing apparatus 110 in the general direction of apparatus 130, the device with which the user wants to initiate communications. The user of apparatus 110 may point apparatus 110 so that the divergent beam from laser 226 in apparatus 110 illuminates apparatus 130. In some example embodiments, the solid angle or field-of-view over which one or more of detectors 214 and 220 is sensitive is the same or nearly the same as the solid angle of the divergent outgoing beam. A transmit beam from apparatus 130 may also be roughly aligned with apparatus 110 by the user of apparatus 130 in the same manner. When the divergent outgoing beams from both apparatus 110 and 130 are illuminating each other, data may be sent from the laser 226 of apparatus 110 to the detector 214 of apparatus 130 and from the laser 226 of apparatus 130 to the detector 214 of apparatus 110.

At 640, the optical transceiver 112 at apparatus 110 may determine if a signal is received from the transmitter of apparatus 130 by determining whether a signal from apparatus 130 is received by one or more of detectors 214 and 220, in accordance with some example embodiments. For example, when the divergent beam from apparatus 130 illuminates apparatus 110, a signal may be received at optical transceiver 112 of apparatus 110. The signal may be encoded or modulated in such a way that apparatus 110 may determine the source of the signal.

At 650, the intensity and angle of the incoming beam 315 are determined by optical transceiver 112 using detector 214, in accordance with some example embodiments. Based on the intensity across detector 214, optical transceiver 112 may determine an amount and a direction to adjust scanning mirror 212 to improve self-alignment between the optical transceivers of apparatuses 110 and 130. Self-alignment information may be exchanged between apparatus 110 and 130 at 672.

At 670, as self-alignment improves from the adjustments to the scanning mirrors of apparatus 110 and 130, the position of tunable lens 218 at apparatus 110 may be adjusted to reduce the divergence of the incoming/outgoing beams at apparatus 110, in accordance with some example embodiments. At 680, the self-alignment is complete or the self-alignment is within an acceptable tolerance of being complete, in accordance with some example embodiments.

Also after a signal is received at detector 214, pairing information and/or identification information may be received at apparatus 110 from apparatus 130 via the divergent beam from apparatus 130. At 662, the identification of apparatus 130 may be confirmed and communications established, in accordance with some example embodiments.

Once the self-alignment is complete and pairing is complete between apparatuses 110 and 130, quantum communications may begin. For example, apparatus 110 may send quantum key data from laser 226 to a quantum key distribution unit 227 at apparatus 130. Quantum communications may be time multiplexed with laser communications whereby the laser is used for one of quantum communications and modulated laser communications at any particular time. The laser 226 of apparatus 110 may also be used for laser communications to detectors 214 and/or 220 of apparatus 130.

Figure 7:
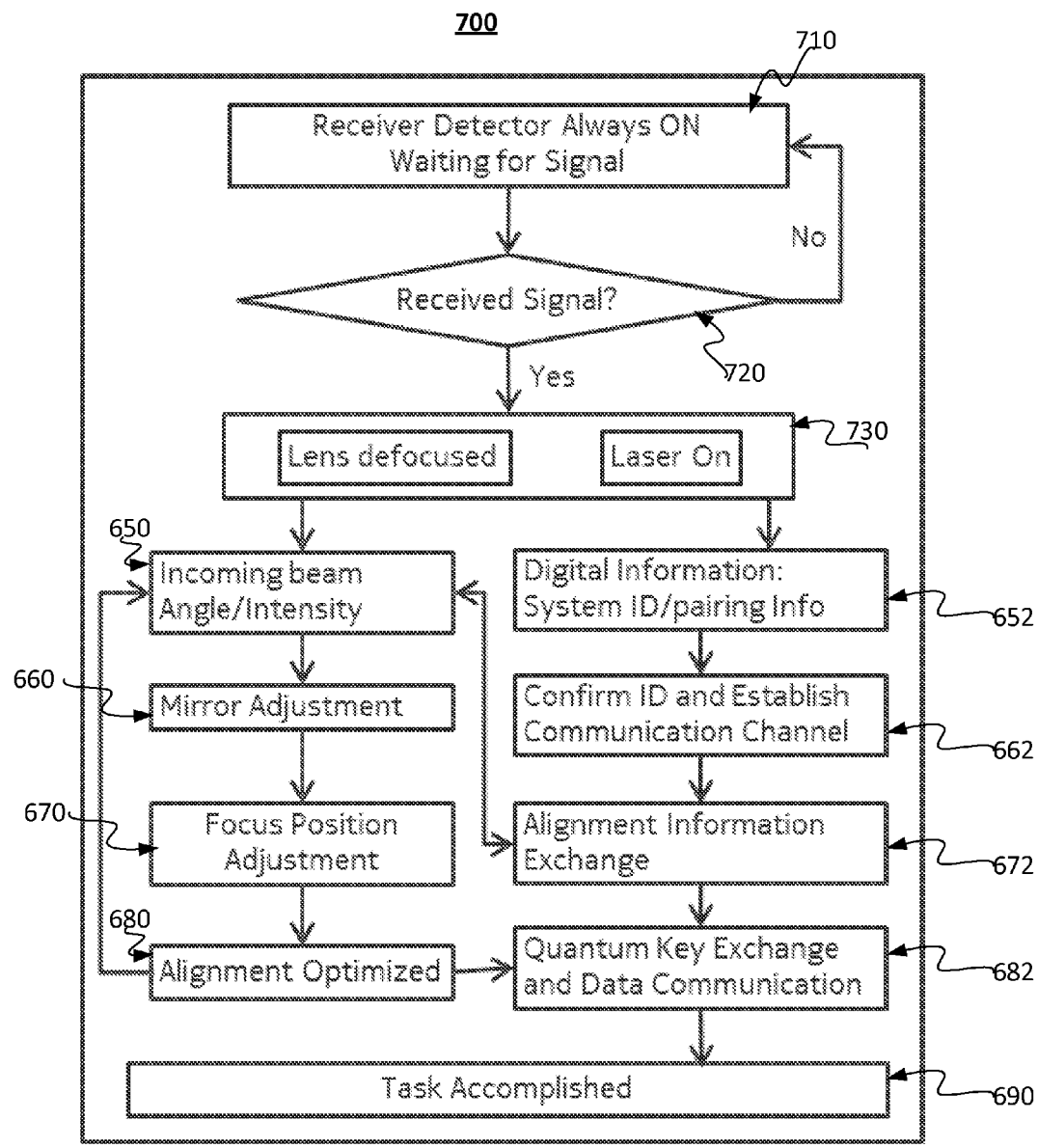
FIG. 7 depicts an example of a process performed by a free-space optical receiver, in accordance with some example embodiments.

FIG. 7 depicts an example of a process for free-space optical receiver, in accordance with some example embodiments. The process of FIG. 7 shares some features with FIG. 6. The process for apparatus 110 to align with another apparatus 130 and pairing with apparatus 130 follows the process described with respect to FIG. 6 above. In some example embodiments, detectors 214 and/or 220 are, however, always on at 710 and waiting for a signal at 720. When a signal is received, laser 226 is turned on and tunable lens 218 is moved to a position to generate divergent beams.

Figure 8:
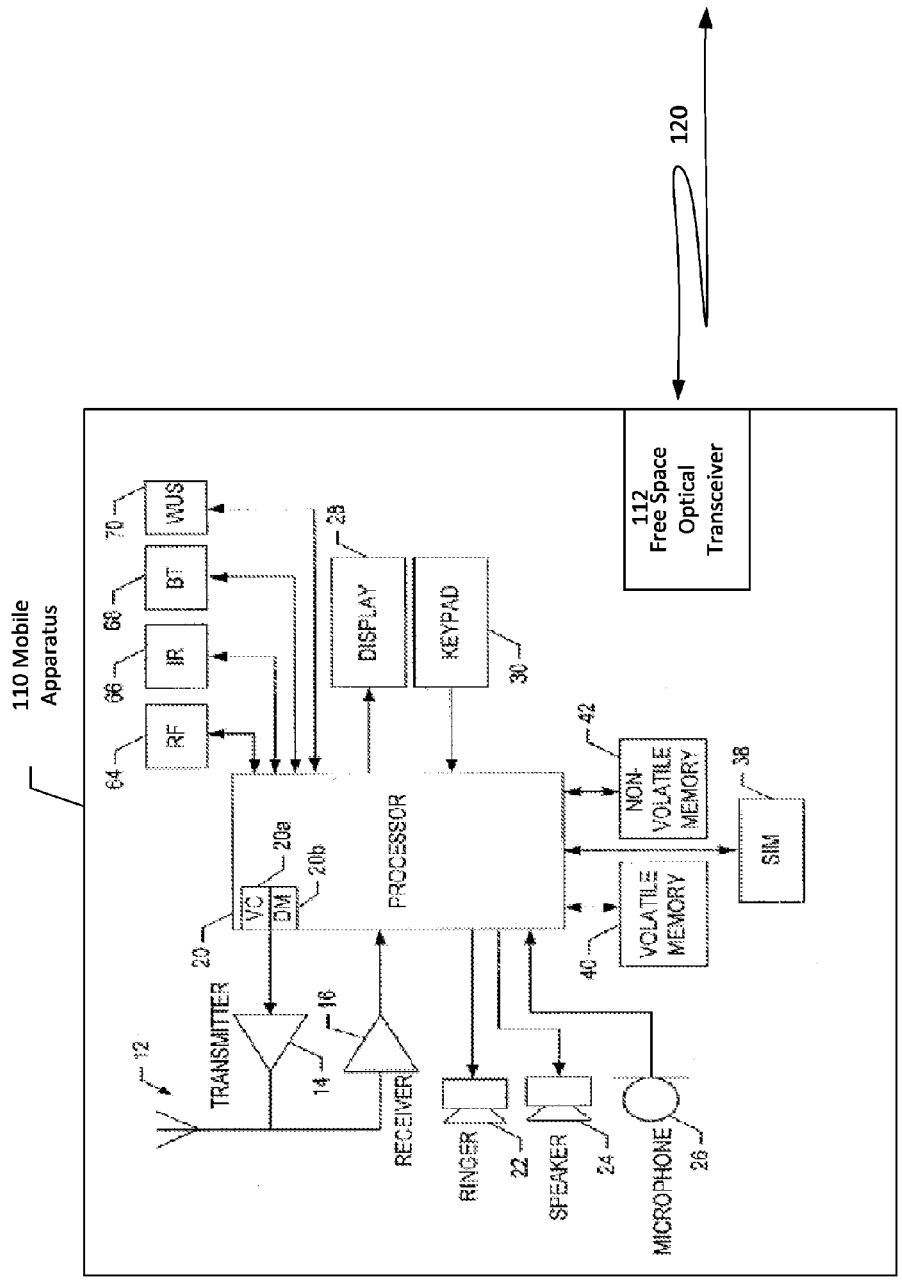
FIG. 8 depicts an example of a mobile device, in accordance with some example embodiments.

FIG. 8 depicts an example of a mobile device, in accordance with some example embodiments. The mobile device 110 may comprise a user equipment, such as a cellular telephone, a smartphone, and the like.

In some example embodiments, the apparatus 110 may include a free-space optical transceiver 112 that may couple to another free-space optical transceiver in another apparatus such as apparatus 130 in FIGS. 1 and 4. In some example embodiments, apparatus 130 may include another user equipment, mobile station, or other portable device.

In some example embodiments, apparatus 110 may perform the methods and/or processed disclosed in FIGS. 3, 4, 6, and/or 7 without the use of a radio network such as a cellular network, or other wireless RF network. For example, an apparatus 110 such as a user equipment may establish communications to another apparatus such as apparatus 130 using optical transceiver 112 without utilizing a cellular service or other communications method between apparatus 110 and another apparatus such as apparatus 130.

In some example embodiments, apparatus 110 including optical transceiver 112 may also include a radio communication link to a cellular network, or other wireless network. Apparatus 110 may send a message to a network node of the radio network indicating the capabilities of apparatus 110. For example, apparatus 110 may indicate to the network node that its capabilities include the capabilities of optical transceiver 112. The network node may enable the apparatus 110 to use its optical transceiver 112 and/or the network node may request that apparatus 110 forward information from the network node or from apparatus 110 to another apparatus such as apparatus 130. For example, the user of apparatus 110 may have information such as video or audio information that the user of apparatus 110 would like to send to apparatus 130. The network node may enable and/or command apparatus 110 to send the information using optical transceiver 112 to apparatus 130 rather than using the radio network.

The apparatus 110 may include at least one antenna 12 in communication with a transmitter 14 and a receiver 16. Alternatively transmit and receive antennas may be separate.

The apparatus 110 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 130 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 110 may include a location processor and/or an interface to obtain location information, such as positioning and/or navigation information. Accordingly, although illustrated in FIG. 1 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 110 may be capable of operating with one or more air interface standards, communication protocols, modulation types, access types, and/or the like. For example, the apparatus 110 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 110 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 110 may be capable of operating in accordance with 2.5G wireless communication protocols General Packet Radio Service (GPRS), Enhanced Data GSM Environment (EDGE), and/or the like. Further, for example, the apparatus 110 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 110 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 110. For example, the processor 20 may comprise a digital signal processor device, a microprocessor device, an analog-to-digital converter, a digital-to-analog converter, and/or the like. Control and signal processing functions of the apparatus 110 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 110 to perform actions. For example, processor 20 may be capable of operating a connectivity program, such as, a web browser. The connectivity program may allow the apparatus 110 to transmit and receive web content, such as location-based content, according to a protocol, such as, wireless application protocol, WAP, hypertext transfer protocol, HTTP, and/or the like.

Apparatus 110 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 110 may include a battery for powering various circuits related to the mobile terminal, for example, a circuit to provide mechanical vibration as a detectable output. The user input interface may comprise devices allowing the apparatus 110 to receive data, such as, a keypad 30 (which can be a virtual keyboard presented on display 28 or an externally coupled keyboard) and/or other input devices.

Moreover, the apparatus 110 may include a short-range radio frequency (RF) transceiver and/or interrogator 64, so data may be shared with and/or obtained from electronic devices in accordance with RF techniques. The apparatus 110 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 110 and, in particular, the short-range transceiver may be capable of transmitting data to and/or receiving data from electronic devices within a proximity of the apparatus, such as within 10 meters. The apparatus 110 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 110 may comprise memory, such as, a subscriber identity module (SIM) 38, a removable user identity module (R-UIM), and/or the like, which may store information elements related to a mobile subscriber. In addition to the SIM, the apparatus 110 may include other removable and/or fixed memory. The apparatus 110 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 110. The functions may include one or more of the operations disclosed herein with respect to free-space optical communications including the process flow of FIGS. 3, 4, 6 and/or 7, and the like. The memories may comprise an identifier, such as, an international mobile equipment identification (IMEI) code, capable of uniquely identifying apparatus 110. In the example embodiment, the processor 20 may be configured using computer code stored at memory 40 and/or 42 to provide the operations disclosed with respect to the process shown in FIGS. 3, 4, 6 and/or 7, and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 3, 4, 6 and/or 7. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIGS. 6 and 7, and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, Wi-Fi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. An apparatus comprising:
    at least one processor; and
    at least one memory including computer program code which, when executed by the at least one processor, causes the apparatus to at least:
        generate an outgoing beam, the outgoing beam being a divergent beam that enables another apparatus to perform an optical alignment with respect to the apparatus;
        detect, at the apparatus, an incoming beam from the other apparatus;
        determine an adjustment to a mirror, the mirror being adjusted to at least optically align the apparatus with respect to the other apparatus, the adjustment being based on at least an optical intensity of the incoming beam across an optical detector at the apparatus, the apparatus being optically aligned with respect to the other apparatus by at least aligning the incoming beam with the optical detector;
        adjust a position of the mirror according to the determined adjustment; and
        change the outgoing beam from the divergent beam to a collimated beam in response to the apparatus and the other apparatus being optically aligned, the collimated beam enabling optical communications between the apparatus and the other apparatus, the optical communications being encoded and decoded with a secret key generated by a quantum key distribution.

2. The apparatus as in claim 1, wherein the apparatus is a mobile device.

3. The apparatus as in claim 1, wherein the apparatus is registered with a network, and wherein the network enables the apparatus to communicate with the other apparatus using the optical communications.

4. The apparatus as in claim 3, wherein the optical communications comprises laser communications.

5. The apparatus as in claim 1, wherein the process to determine, to adjust, or to change are performed automatically.

6. The apparatus as in claim 1, further comprising: communicate information between the apparatus and the other apparatus using the outgoing beam.

7. A method comprising:
    generating, at a first mobile device, an outgoing beam, the outgoing beam being a divergent beam that enables a second mobile device to perform an optical alignment with respect to the first mobile device;
    detecting, at the first mobile device, an incoming beam from the second mobile device;
    determining an adjustment to a mirror at the first mobile device, the mirror being adjusted to at least optically align the first mobile device with respect to the second mobile device, the adjustment being based on at least an optical intensity of the incoming beam across an optical detector at the first mobile device, the first mobile device being optically aligned with respect to the second mobile device by at least aligning the incoming beam with the optical detector at the first mobile device;
    adjusting a position of the mirror according to the determined adjustment; and
    in response to the first mobile device and the second mobile device being optically aligned, changing the outgoing beam from the divergent beam to a collimated beam, the collimated beam enabling optical communications between the first mobile device and the second mobile device, the optical communications being encoded and decoded with a secret key generated by a quantum key distribution.

8. The method as in claim 7, wherein the first mobile device is registered with a network, and wherein the network enables the first mobile device to communicate with the second mobile device using the optical communications.

9. The method as in claim 8, wherein the optical communications comprises laser communications.

10. The method as in claim 7, wherein the determining, the adjusting, and the changing are performed automatically.

11. The method as in claim 7, further comprising: communicating information between the first mobile device and the second mobile device using the outgoing beam.

12. A non-transitory computer-readable medium encoded with instructions that, when executed by at least one processor, cause to perform operations comprising:
    generating, at a first mobile device, an outgoing beam, the outgoing beam being a divergent beam that enables a second mobile device to perform an optical alignment with respect to the first mobile device;
    detecting, at the first mobile device, an incoming beam from the second mobile device;
    determining an adjustment to a mirror at the first mobile device, the mirror being adjusted to at least optically align the first mobile device with respect to the second mobile device, the adjustment being based on at least an optical intensity of the incoming beam across an optical detector at the first mobile device, the first mobile device being optically aligned with respect to the second mobile device by at least aligning the incoming beam with the optical detector at the first mobile device;
    adjusting a position of the mirror according to the determined adjustment; and
    in response to the first mobile device and the second mobile device being optically aligned, changing the outgoing beam from the divergent beam to a collimated beam, the collimated beam enabling optical communications between the first mobile device and the second mobile device, the optical communications being encoded and decoded with a secret key generated by a quantum key distribution.

13. The non-transitory computer-readable medium as in claim 12, wherein the first mobile is registered with a network, and wherein the network enables the first mobile device to communicate with the second mobile device using the optical communications.

14. The non-transitory computer-readable medium as in claim 13, wherein the optical communications comprises laser communications.

15. The non-transitory computer-readable medium as in claim 12, wherein the determining, the adjusting, and the changing are performed automatically.

16. The non-transitory computer-readable medium as in claim 12, further comprising: communicating information between the first mobile device and the second mobile device using the outgoing beam.

* * * * *